United States Patent
Baker et al.

(10) Patent No.: US 10,452,482 B2
(45) Date of Patent: Oct. 22, 2019

(54) SYSTEMS AND METHODS FOR CONTINUOUSLY AVAILABLE NETWORK FILE SYSTEM (NFS) STATE DATA

(71) Applicant: Oracle International Corporation, Redwood Shores, CA (US)

(72) Inventors: William Eugene Baker, Austin, TX (US); Piyush Shivam, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 202 days.

(21) Appl. No.: 15/378,721

(22) Filed: Dec. 14, 2016

(65) Prior Publication Data

US 2018/0165159 A1    Jun. 14, 2018

(51) Int. Cl.
| | | |
|---|---|---|
| *G06F 11/00* | (2006.01) | |
| *G06F 11/14* | (2006.01) | |
| *H04L 29/08* | (2006.01) | |
| *G06F 16/16* | (2019.01) | |
| *G06F 16/182* | (2019.01) | |
| *H04L 29/06* | (2006.01) | |

(52) U.S. Cl.
CPC ...... *G06F 11/1448* (2013.01); *G06F 11/1464* (2013.01); *G06F 11/1469* (2013.01); *G06F 11/1471* (2013.01); *G06F 16/164* (2019.01); *G06F 16/183* (2019.01); *H04L 67/1097* (2013.01); *H04L 67/42* (2013.01)

(58) Field of Classification Search
CPC ............. G06F 11/1448; G06F 11/1464; G06F 11/1469; G06F 11/1471; G06F 11/3012; G06F 17/30203; G06F 16/164; G06F 16/189; G06F 67/42; H04L 67/1097
See application file for complete search history.

(56) References Cited

U.S. PATENT DOCUMENTS

| | | | |
|---|---|---|---|
| 6,247,139 B1 * | 6/2001 | Walker | ............. G06F 17/30067 709/227 |
| 9,069,682 B1 * | 6/2015 | Veeraswamy | ....... G06F 12/0888 |
| 2002/0049917 A1 * | 4/2002 | Portman | .................. G06F 1/30 713/300 |

(Continued)

OTHER PUBLICATIONS

Journaling, Udacity, Available Online at: URL:https://www.youtube.com/watch?v=jeyOBEqCEkM, Feb. 23, 2015, 1 page.

(Continued)

*Primary Examiner* — Jason B Bryan
(74) *Attorney, Agent, or Firm* — Kilpatrick Townsend & Stockton LLP

(57) ABSTRACT

According to some embodiments of the invention, systems and methods are provided for capturing and storing state information corresponding to various states of the network file system (NFS) for use in recovery during a system failure. In various aspects, the disclosed systems and methods may automatically collect and synchronously write state changes made to the NFS to non-volatile storage. In the event of an NFS system failure or crash (e.g., a failure of the NFS server), the state information corresponding to the NFS system may be automatically imported from the non-volatile storage, thereby enabling NFS services to be resumed immediately and transparently.

20 Claims, 7 Drawing Sheets

(56) References Cited

U.S. PATENT DOCUMENTS

2017/0277715 A1* 9/2017 Strauss ............ G06F 17/30227

OTHER PUBLICATIONS

Journaling File System, Available Online at: URL:https://en.wikipedia.org/w/index.php?title=Journaling_file_system&oldid= 747654335, Nov. 16, 2016, 4 pages.
Haynes et al., "Network File System (NFS) Version 4 Protocol draft-ietf-nfsv4-rfc3530bis-35; draft-ietf-nfsv4-rfc3530bis-32. txt", Dec. 4, 2014, pp. 1-300.
International Application No. PCT/US2017/066325, International Search Report and Written Opinion dated Mar. 2, 2018, 12 pages.

* cited by examiner

SYSTEMS AND METHODS FOR CONTINUOUSLY AVAILABLE NETWORK FILE SYSTEM (NFS) STATE DATA

FIELD

The present disclosure generally relates to storage systems, and more specifically to systems and methods for continuously available network file system (NFS) state data.

BACKGROUND

Previous implementations of the network file system (NFS) protocol are stateless in that they do not associate states with client-server transactions. Some protocols benefit from statelessness in that application development may be simplified if no client-server transaction depends on another client-server transaction. However, previous implementations of NFS protocol may suffer from performance issues due to statelessness. For example, previous implementations of NFS protocol may experience lock management issues that may slow recovery.

Unlike the previous implementations, the current network file system (NFS) protocol is stateful, meaning that the effect of operations are dependent on the effect of previous operations and do not stand alone. In response to a system failure, such as a NFS server failure, conventional NFS protocols force clients to retransmit all previous state information and/or related data to the servers in a graceful recovery period. While effective in restoring service, doing so may inject unnecessary delays in NFS server startup time. These delays can be detrimental to the performance of "high availability" NFS storage devices.

BRIEF SUMMARY

Provided are methods, including computer-implemented methods, devices including storage devices and/or network devices, and computer-program products for continuously available NFS state data.

According to some embodiments of the invention, a method is provided. The method comprises receiving, by an NFS server, instructions to change a state corresponding to a data object accessible by the NFS server from a current state to a new state. The method further comprises storing, by the NFS server, an indication of the new state in volatile memory. The method further comprises retrieving, by the NFS server, the indication of the new state from the volatile memory. The indication is stored in association with an identifier of the data object. The method further comprises writing, by the NFS server, metadata representing the new state at a location in non-volatile storage. The metadata is written in association with a same or different identifier of the data object. The method further comprises detecting, by the NFS server, a failure involving the NFS server. The method further comprises retrieving, by the NFS server, the metadata representing the new state from the location in the non-volatile storage. The method further comprises resuming service, by the NFS server, in accordance with the new state.

According to some embodiments of the invention, a device is provided. The device comprises one or more processors. The device further comprises a non-transitory computer-readable medium containing instructions that, when executed by the one or more processors, cause the one or more processors to perform operations including the steps of the above method.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform operations including the steps of the above method.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
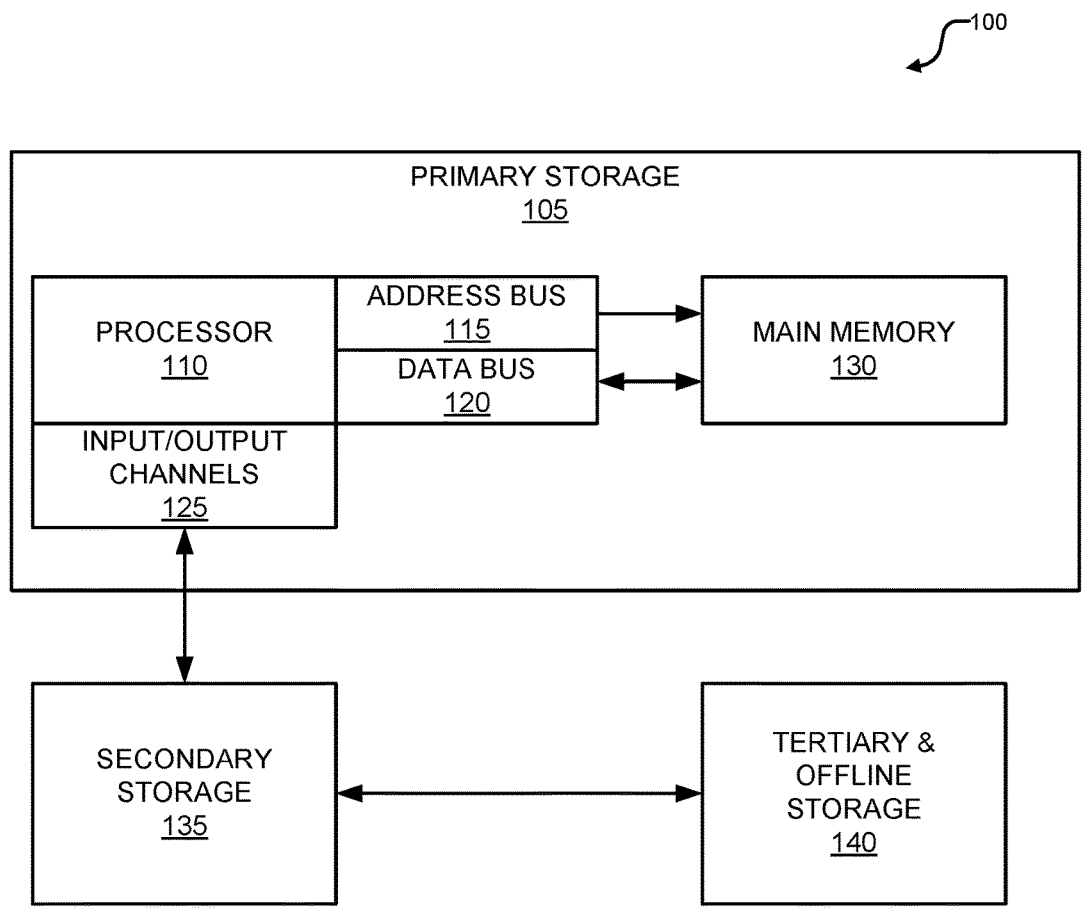
FIG. 1 is a block diagram illustrating a data storage system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments.

However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Data Storage Systems

Data storage systems may include any separate or combined storage devices and/or components that are used to retain, and in some cases process, data. Without data storage systems, computing devices would be limited to the performance of certain operations and would have to immediately output the result. The use of data storage systems may allow computing devices to perform a wider range of operations, store and reference the results of performed operations (either short-term or long-term), and store and execute specialty applications for a variety of purposes. As used herein, a "storage device" may be any component or combination of components used to retain data in a data storage system.

FIG. 1 is a block diagram illustrating a data storage system 100, in accordance with some embodiments. The data storage system 100 may be included, in whole or in part, in one or more computing devices, such as personal computers (e.g., clients) or servers (e.g., hosts). The data storage system 100 may include primary storage 105, secondary storage 135, and tertiary & offline storage 140. Although shown and described as including these three different types of storage, it is contemplated that the data storage system 100 may implement more or less different types of storage, either separately or in combination. Further, although shown and described as including one of each of these different types of storage, it is contemplated that none or more than one of the different types of storage may be included. For example, in some embodiments, more than one storage device may be included in secondary storage 135.

Primary storage 105 may include a processor 110 (or more than one processor 110) and main memory 130. The processor 110 may be or include, for example, a central processing unit (CPU). The processor 110 may retrieve and manipulate data stored in the data storage system 100. Thus, in general, data stored in the data storage system 100 in close proximity to the processor 110 may be retrieved and processed fastest, while data stored in the data storage system 100 further from the processor 110 may be processed slower. However, frequently, some configurations can result in only a small amount of data being available to be stored in close proximity to the processor 110 (and in some embodiments, only temporarily), while larger storage options may generally be positioned further from the processor 110 (and may be used to permanently store data).

The processor 110 may include its own memory (not shown). The memory of processor 110 may include one or more processor registers and one or more processor caches. The processor registers may hold a small discrete amount of data (e.g., 8, 32 or 64 bits). The processor registers may take on any of a number of forms. For example, the processor registers may include one or more data registers. The processor 110 may load data from larger storage in the data storage system 100 (e.g., main memory 130) into the data registers to perform operations or manipulations on the data. The data may then be stored back to the larger storage (e.g., main memory 130). In another example, the processor registers may include one or more address registers. The address registers may hold addresses for data that may be requested by executed instructions. In still another example, the processor registers may include one or more general purpose registers. The general purpose registers may be combination registers that may store data and/or addresses. Other types of registers that may be alternatively or additionally included in the processor registers include floating point registers, status registers, constant registers, vector registers, special purpose registers, machine specific registers, internal registers, and the like. The processor registers may be the fastest type of storage available in the data storage system 100 due to its location inside the processor 110, but may be limited by a small amount of data.

The processor 110 may also include one or more processor caches. The processor caches may include one or more data caches. The data caches may store data that is frequently used. The processor caches may alternatively or additionally include one or more instruction caches. The instruction caches may store executable instructions that are frequently used. The processor caches may alternatively or additionally include a translation lookaside buffer. The translation lookaside buffer may be used to expedite virtual-to-physical address translation for executable instructions and data. Although the processor caches are also located inside the processor 110, they may be slower than the processor registers. However, the processor caches may be preferable over the main memory 130 for storage of actively or commonly used data or instructions in small amounts, as the processor caches may be accessed faster than the main memory 130.

The processor 110 may be directly or indirectly coupled to the main memory 130 over an address bus 115 and a data bus 120. When requesting certain data from the main memory 130, the processor 110 may send a memory address to the main memory 130 over the address bus 115. The memory address may indicate the location of the data being requested. The processor 110 may then read the data from the main memory 130 over the data bus 120. The processor 110 may alternatively or additionally write data to the main memory 130 over the data bus 120.

The main memory 130 may include, for example, random access memory (RAM), such as dynamic RAM (DRAM), static RAM (SRAM), synchronous DRAM (SDRAM), or any other type of volatile storage. "Volatile" storage, as used herein, may refer to a characteristic of storage devices that do not retain their contents when not supplied with power and thus are uninitialized upon booting up (e.g., temporary storage). In other words, volatile storage may require a constant source of power to retain stored data. The terms "volatile storage" and "volatile memory" may be used interchangeably herein. Although the main memory 130 may be volatile, access to data stored therein is generally faster than that stored in secondary storage 135 or tertiary & offline storage 140 due to its close proximity to the processor 110. In some embodiments, the primary storage 105 may also include non-volatile storage, such as read only memory (ROM).

The processor 110 may use input/output channels 125 to access the secondary storage 135. The secondary storage 135 may include, for example, hard disk drives, solid state drives, flash memory, or any other type of non-volatile storage. "Non-volatile" storage, as used herein, may refer to a characteristic of storage devices that retain their contents when powered down, and data may be stored therein temporarily or permanently. The secondary storage 135 may have one or more file systems stored thereon that may provide a hierarchy of files and directories stored in the secondary storage 135, as described further herein with respect to FIG. 3. In some embodiments, the secondary storage 135 may also include volatile storage, such as RAM disks.

In some embodiments, the primary storage 105 is collocated with the secondary storage 135, e.g., on a single computing device. However, it is contemplated that in some embodiments, the primary storage 105 may be located remotely from the secondary storage 135, e.g., on two or more different computing devices. For example, the secondary storage 135 may be located at a host, while the primary storage 105 may be located at a client. The client may issue commands to retrieve and access data stored on the secondary storage 135 at the host using the processor 110 of the primary storage 105 at the client.

Tertiary & offline storage 140 may include tertiary storage, such as removable mass storage media used to store large amounts of data that is not accessed often, but may be accessed without human intervention using robotic technologies. Tertiary & offline storage 140 may alternatively or additionally include offline storage, such as removable storage media that may not be accessed without human intervention, such as CD-ROMs, CD-RWs, DVDs, floppy disks, Universal Serial Bus (USB) flash drives, and the like. Offline storage may be recorded and physically disconnected from the data storage system 100. Although shown as being in communication with the secondary storage 135, it is contemplated that the tertiary & offline storage 140 may alternatively or additionally be in direct communication with the primary storage 105.

File Systems

Figure 2:
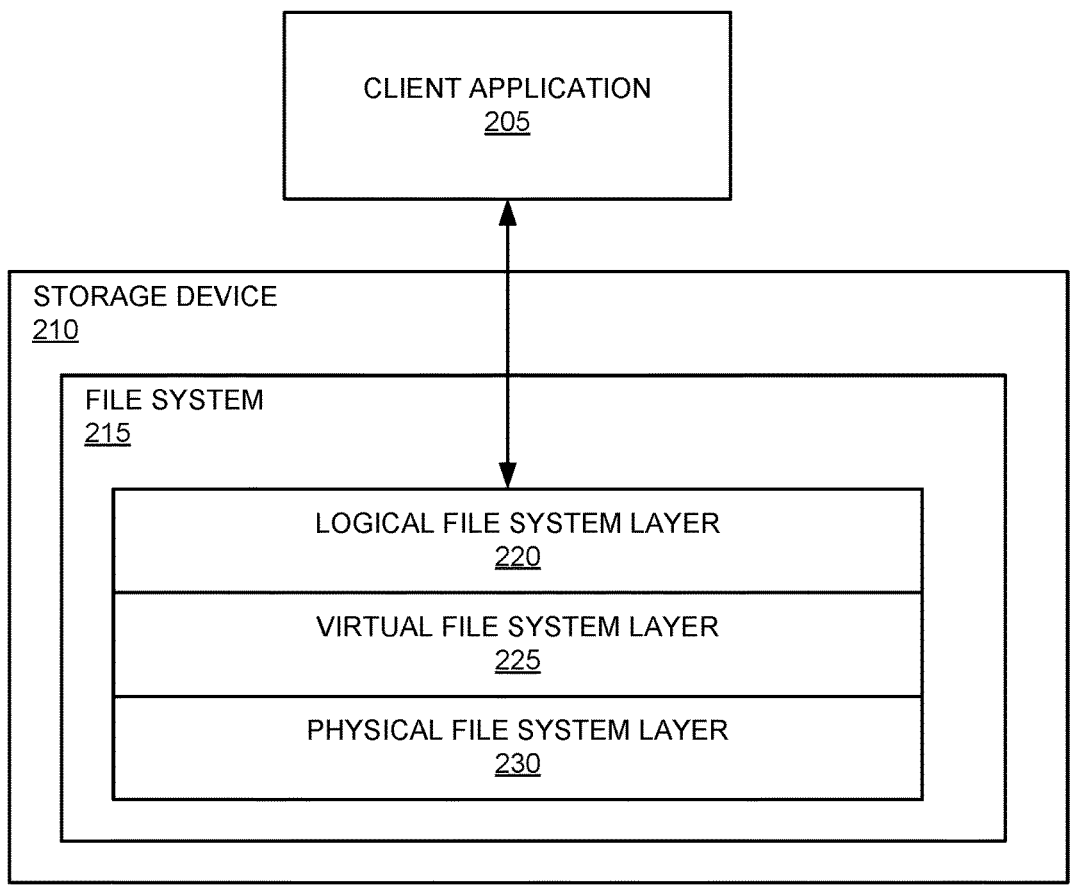
FIG. 2 is a block diagram illustrating the layers of a file system of a storage device, in accordance with some embodiments.
Figure 3:
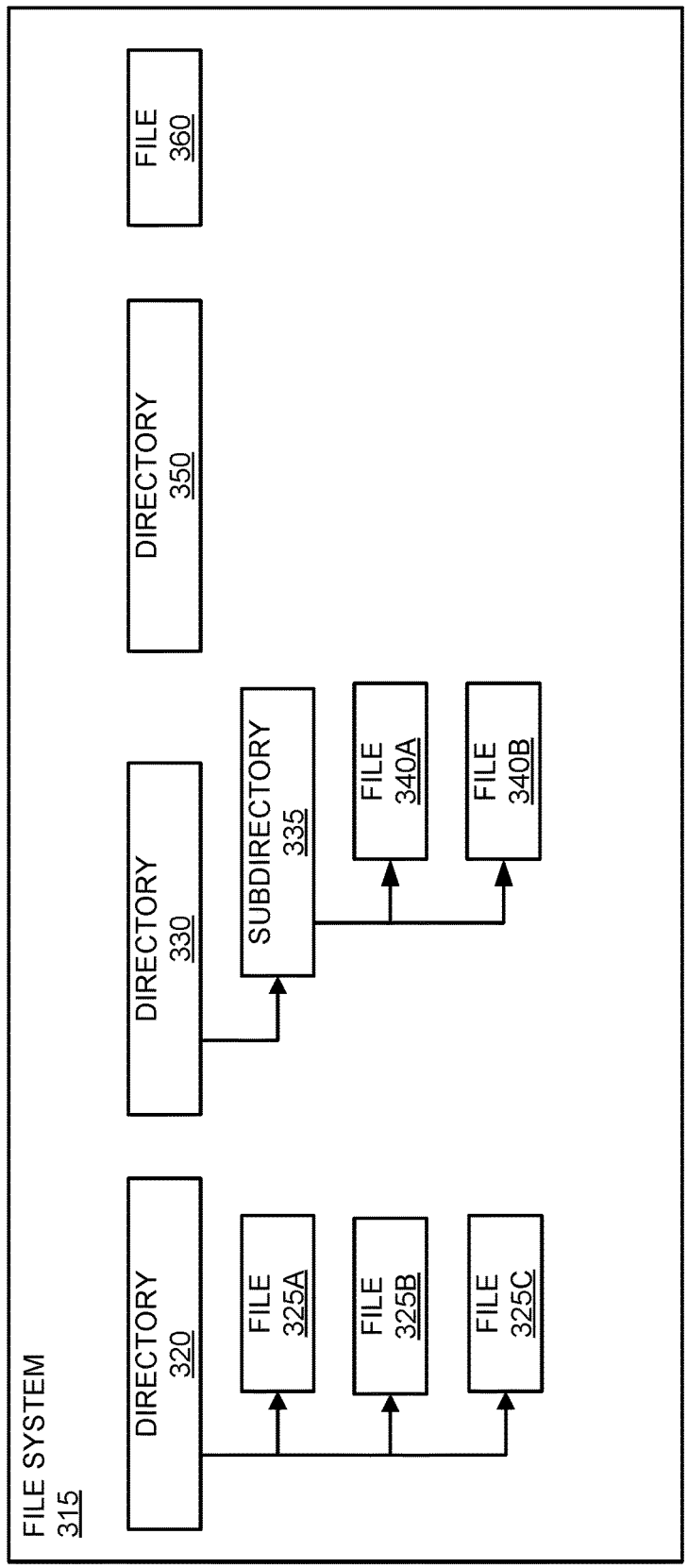
FIG. 3 is a block diagram illustrating a hierarchy for data stored or mounted in a file system, in accordance with some embodiments.

A storage device of a data storage system may implement one or more file systems to organize the data stored thereon. As used herein, a "file system" may refer to a structure or organization of files or directories, and a "file" may refer to a group of data. Each file may be associated with a filename that allows that file to be uniquely identified and located. A number of different file systems may be used depending on the specific requirements and desired applications. FIGS. 2 and 3 illustrate exemplary file systems that may be implemented on a storage device.

FIG. 2 is a block diagram illustrating the layers of a file system 215 of a storage device 210, in accordance with some embodiments. The file system 215 may have three layers: a logical file system layer 220, a virtual file system layer 225, and a physical file system layer 230. Although shown and described as having these three layers, it is contemplated that fewer or more layers may be used. For example, in some embodiments, the functions of the logical file system layer 220, the virtual file system layer 225, and the physical file system layer 230 may be combined into a single layer. In some embodiments, the virtual file system layer 225 may be omitted.

The logical file system layer 220 may interact with the client application 205 to process requests for data. The logical file system layer 220 may provide the application programming interface (API) for file access and operations (e.g., open, close, read, write, etc.). The logical file system layer 220 may receive the requested operation and may pass it to the virtual file system layer 225 to be passed to the physical file system layer 230.

The logical file system layer 220 may provide a consistent view of multiple physical file systems that may be defined by multiple file system implementations. This consistency may be provided by the abstraction of the physical file system layer 230 that is implemented by the virtual file system layer 225. The abstraction may specify a set of operations that a given implementation should include in order to carry out file system requests received through the logical file system layer 220. Thus, the abstraction carried out by the virtual file system layer 225 may provide a uniform interface to the logical file system layer 220.

In other words, the virtual file system layer 225 may provide support for multiple different physical file systems. The virtual file system layer 225 may allow the client application 205 to access different types of file systems in a uniform way. For example, the virtual file system layer 225 may allow the client application 205 to access file systems on both local storage devices and network storage devices, file systems for different operating systems (e.g., Windows, Mac OS, Unix, etc.), file systems of different types (e.g., Unix file system (UFS), network file system (NFS), etc.), and the like.

The physical file system layer 230 may process the requested operation on a file (e.g., read, write, etc.). The physical file system layer 230 may physically place files in specific locations on the storage device 210. The physical file system layer 230 may interact with the drivers of the storage device 210 to physically operate the storage device 210.

FIG. 3 is a block diagram illustrating a hierarchy for data stored or mounted in a file system 315, in accordance with some embodiments. In some embodiments, data may be physically stored in the file system 315 according to the hierarchy shown in FIG. 3, such as in a Windows operating system (using file systems such as, e.g., FAT, NTFS, exFAT, Live File System, ReFS file system, etc.). In some embodiments, data may instead be physically stored under a single root directory. The file system 315 may be "mounted" by informing the operating system where in the hierarchy certain files should appear. These embodiments may be implemented in a Unix or Unix-like operating system.

The file system 315 may include one or more directories (e.g., directories 320, 330, 350), one or more subdirectories (e.g., subdirectory 335), and one or more files (e.g., files 325A-C, 340A-B, 360). Directories (which may also be referred to herein as "folders") may group files into separate collections. For example, directory 320 may include files 325A-C. Directories may also include subdirectories. For example, directory 330 may include subdirectory 335, and subdirectory 335 may include files 340A-B. Directories may also be created without any files (e.g., directory 350). Files may also be located in the file system 315 without an associated directory (e.g., file 360).

File (e.g., files 325A-C, 340A-B, 360) within the file system 315 may have associated metadata. The metadata may be stored separately from the file (not shown). The metadata may include, for example, the amount of data in the file, a file timestamp (e.g., the last time the file was modified, when the file was created, the time the file was last backed up, and/or when the file was last accessed), a user ID, access permissions, file attributes (e.g., read only, read/write, etc.), and the like.

Network Devices

Figure 4:
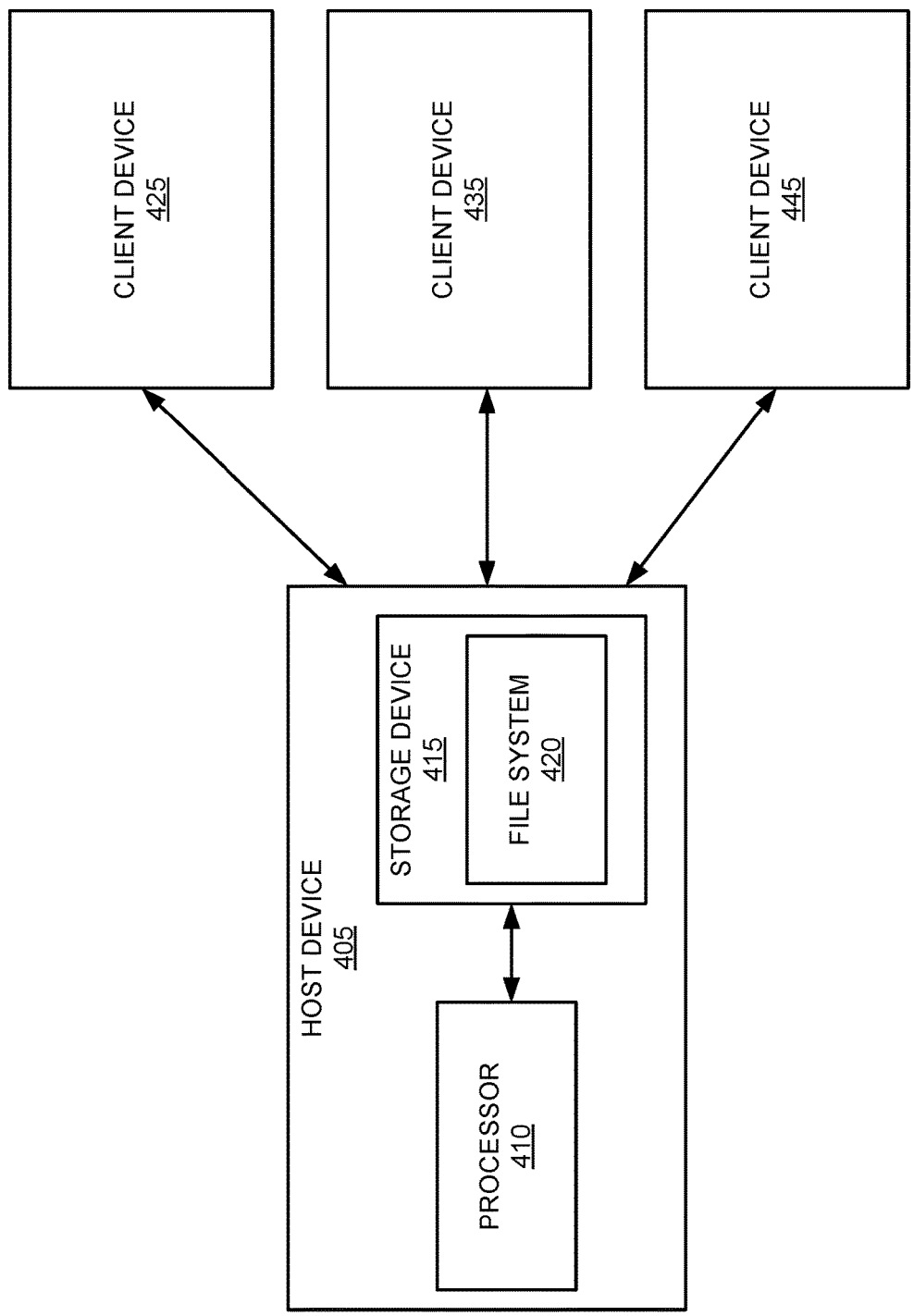
FIG. 4 is a block diagram illustrating a host device in a network, in accordance with some embodiments.

Data storage systems may be implemented as network devices accessible by client devices over a network. FIG. 4 is a block diagram illustrating a host device 405 in a network, in accordance with some embodiments. The host device 405 may be a host storage device, host computing device (e.g., a host server), and/or host data storage system. The host device 405 may include a processor 410 and storage 415. The processor 410 may be similar to the processor 110 of FIG. 1. The storage 415 may include primary storage 105, secondary storage 135, and/or tertiary & offline storage 140 of FIG. 1. The storage 415 may include a file system 420, which may be similar to file system 215 of FIG. 2 and/or file system 315 of FIG. 3. As discussed herein with respect to FIG. 1, it is contemplated that in some embodiments, processor 410 of host device 405 is not necessary, and respective processors of client devices 425, 435, 445 may be used to process requests for data from host device 405.

The host device 405 may communicate over a network with the client devices 425, 435, 445. The host device 405 may communicate with the client devices 425, 435, 445 through any standard data connection, including but not limited to an Internet connection. This may include a wireless channel (e.g., a Wi-Fi connection), a wired connection (e.g., DSL, cable modem, etc.), or a combination of both. The client devices 425, 435, 445 may utilize the host device 405 to store data, define rules, set permissions, and the like. The host device 405 may also be in communication with one or more user devices (not shown). The user devices may utilize the host device 405 to request and/or use data. In addition, although shown and described as being in communication with three client devices 425, 435, 445, it is contemplated that host device 405 may be in communication with any number of client devices in this embodiment.

The host device 405 may store data that may be requested by and transmitted to the client devices 425, 435, 445 for any purpose. In these embodiments, data that may be requested from the host device 405 may be referred to as a "share", i.e., a resource that may be made available by one device to other devices. For example, the client devices 425, 435, 445 may be requesting an application or service. In another example, the host device 405 may be performing migration of one or more files, file systems, and/or databases to one or more of client devices 425, 435, 445.

Network File System (NFS)

The network file system (NFS) allows a host device to share files and directories with client devices over a network. This allows client devices to access the remote files and directories in the same way that client devices would access local files and directories. The NFS structure may provide numerous advantages. For example, the client devices use less storage space because data can be stored on a single, central host device and still be accessible to the client devices. Thus, data that would otherwise be duplicated on each client device can be stored in a single location and accessed by multiple client devices on a network.

Figure 5:
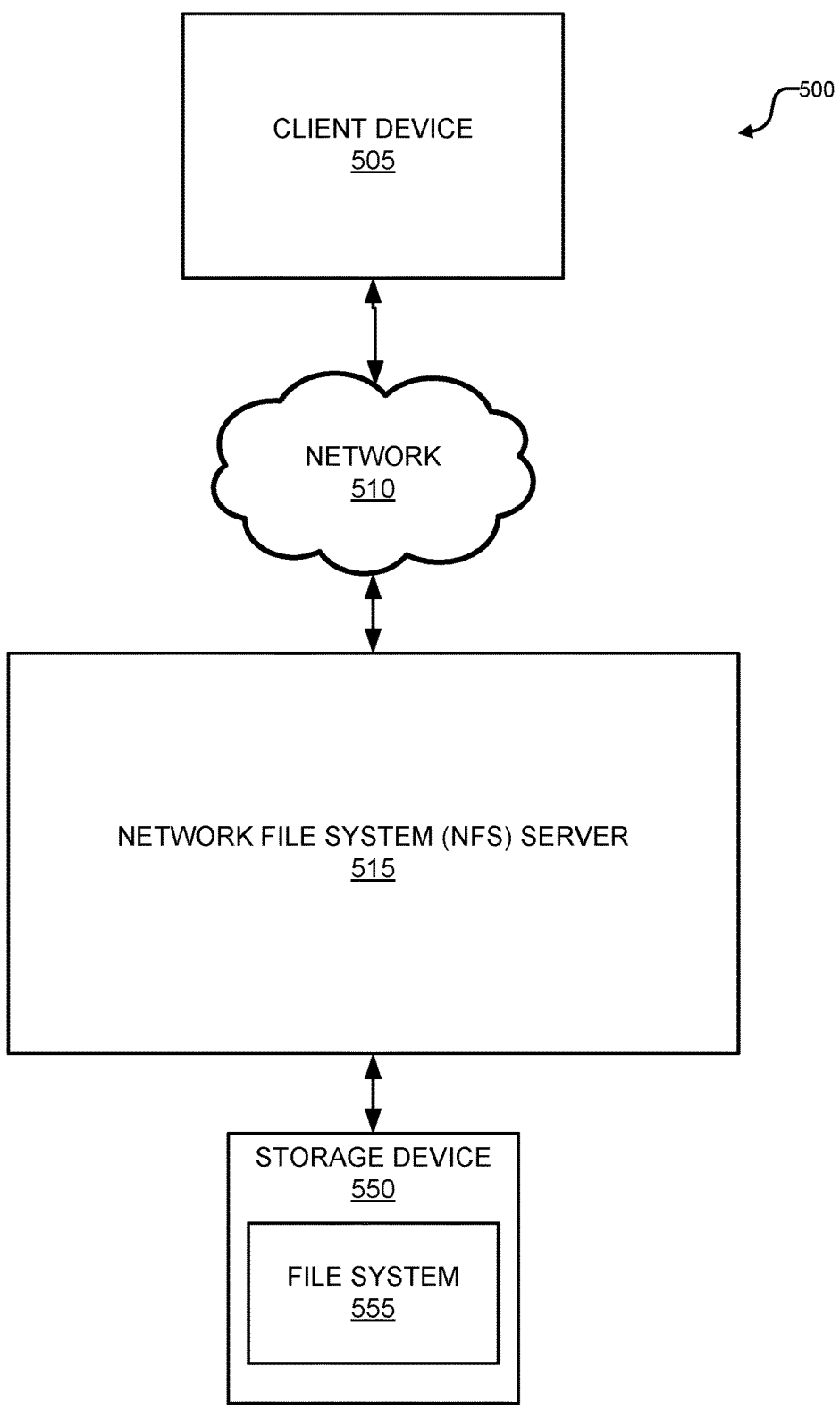
FIG. 5 is a block diagram illustrating a network file system (NFS) host-client system, in accordance with some embodiments.

FIG. 5 is a block diagram illustrating an NFS host-client system 500, in accordance with some embodiments. The system 500 may include a client device 505 in communication with an NFS server 515 (i.e., a host) over a network 510. The NFS server 515 may have access to a storage device 550 including a file system 555. Although shown and described as being separate components, it is contemplated that the storage device 550 may be included in the NFS server 515 in some embodiments.

In practice, the client device 505 may issue requests to access or perform operations on data objects on the NFS server 515 over the network 510. The requests may be encapsulated into a standardized message format defined by the NFS protocol. As used herein, "data objects" may refer to any of data, files, applications, subdirectories, directories, file systems, combinations thereof, and the like. Once the request is received, the NFS server 515 may allow the client device 505 to access the data objects from the file system 555 of the storage device 550. For example, the NFS server 515 may transmit the data objects from the file system 555 to the requesting client device 505. In another example, the NFS server 515 may allow the client device 505 to mount a remote directory from the file system 555 on a local directory at the client device 505.

The NFS server 515 may also allow the client device 505 to perform one or more operations on the data objects. For example, the client device 505 may open a data object, read a data object, write a data object, close a data object, create a data object, lock a data object, delete a data object, delegate a data object, combinations thereof, and the like. Some or all of these operations may be tracked by the NFS server 515 in the form of states. The NFS server 515 may track one or more of these states that are associated with one or more data objects. In some embodiments, the client device 505 may additionally track these states.

In some embodiments, the NFS server 515 may first determine whether the client device 505 has the proper permissions to access or perform particular operations on the data objects from the file system 555 of the storage device 550. As used herein, "permissions" define access control options that can be applied to one or more users. For example, the NFS server 515 may inspect metadata associated with the data objects to ensure that the requesting user (e.g., a user ID associated with client device 505) is associated with a "read" operation of the data objects. If the requesting user is not associated with that operation, the NFS server 515 may deny access to the data objects by the client device 505.

Continuously Available NFS State Data

Previous implementations of the network file system (NFS) protocol (e.g., NFSv3) are stateless in that they do not associate states with client-server transactions. Some protocols benefit from statelessness in that application development may be simplified if no client-server transaction depends on another client-server transaction. However, previous implementations of NFS protocol may suffer from performance issues due to statelessness. For example, previous implementations of NFS protocol may experience lock management issues that may slow recovery.

Unlike the previous implementations, the current network file system (NFS) protocol is stateful, meaning that the effect of operations are dependent on the effect of previous operations and do not stand alone. Conventionally, state information for data objects is stored in volatile memory for fast access and updating, as compared to non-volatile storage. As discussed above, however, volatile memory is erased when power is lost to the storage system. Thus, in the event of a crash or failure of the NFS server, conventional NFS protocols frequently rely upon clients to retransmit all previous state information and/or related data to the servers in a graceful recovery period. While effective in restoring service, doing so may inject unnecessary delays in NFS server startup time. These delays can be detrimental to the performance of "high availability" NFS storage devices.

In addition, state information for data objects on one storage device may be difficult to reproduce from volatile memory onto another storage device, even without a crash or failure. For example, it may be desirable to mirror a source storage device with a destination storage device to seamlessly replace the source storage device or to backup data at a given point in time. In such situations, the data objects themselves are typically only migrated. It may be desirable to also migrate the state of the data objects in order to truly mirror the source storage device at a given time. During migration, however, data that is stored in volatile memory (e.g., state information) would not typically not migrated to the destination storage device.

Thus, according to some embodiments of the invention, systems and methods are provided for capturing and storing state information corresponding to various states of the NFS. In various aspects, the disclosed systems and methods may automatically collect and synchronously write state changes made to the NFS to non-volatile storage. In the event of an NFS system failure or crash (e.g., a failure of the NFS server), the state information corresponding to the NFS system may be automatically imported from the non-volatile storage, thereby enabling NFS services to be resumed immediately and transparently. In the case of a migration, the state information may be transferred from the non-volatile storage to a destination storage device, which can then import it into memory to mirror the source storage device.

Figure 6:
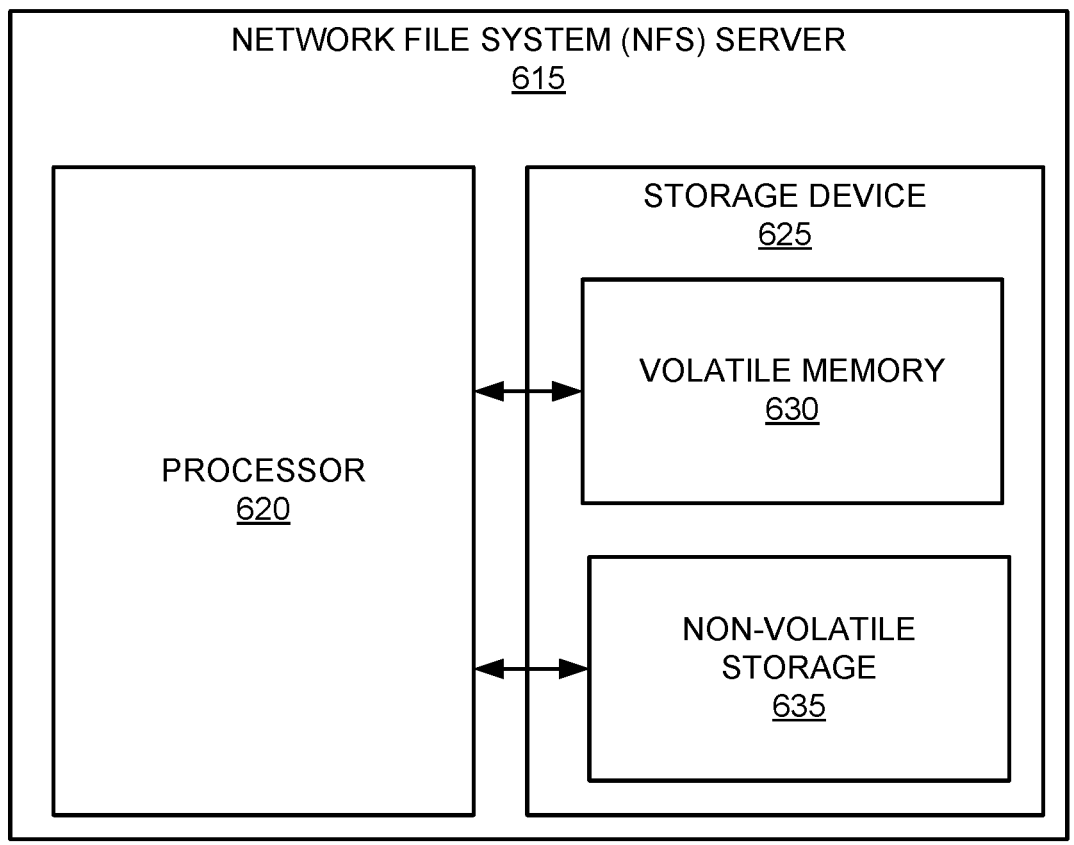
FIG. 6 is a block diagram illustrating an NFS server, in accordance with some embodiments.

FIG. 6 is a block diagram illustrating an NFS server 615, in accordance with some embodiments. The NFS server 615 may include a processor 620 in communication with volatile memory 630 and non-volatile storage 635. The volatile memory 630 and the non-volatile storage 635 may be included in a storage device 625. The storage device 625 may be the same as or a different storage device than storage device 550 of FIG. 5.

When a request is received from a client device (e.g., client device 505 of FIG. 5) to perform some operation on a data object accessible by the NFS server 615, a state corresponding to the data object may be changed from a current state to a new state. The request to perform an operation may be received as a command to the NFS server 615. For example, the client device may issue a command to "lock" a particular data object. Thus, the request may include the command (e.g., "lock"), and the name of the data object that should be locked.

Once the request is received by the NFS server 615, it may be executed (e.g., in the above example, the data object may be locked). After execution, the state corresponding to the data object may be updated from a current state (e.g., a previously issued command on the data object) to the new state of the data object (e.g., a "lock" state). The state (i.e., current state or new state) may include, for example, a client state, a server state, a delegate state, an open state, a lock state, and/or the like.

The client state may represent the "root" state and may be utilized to reclaim any other state on the NFS server 615. The client state may be used to identify a client instance, such as a client restart instance. The server state may be used to identify a server restart instance. A delegate state may be used to delegate management of a data object to a client device. For example, the NFS server 615 may grant a read delegation or a write delegation to a client device. The open state may be used to indicate that a data object is open on a client device. As used herein, "open" may be used to describe the state in which a data object is accessed on a client device. For example, an "open" data object may include a data object that is being displayed in the case of displayable file types, but may also include a data object that is being executed in the case of applications or other executable file types. The same open owner may be used simultaneously for many opened data objects. The NFS server 615 may compare an open owner to a file descriptor that may be shared among multiple processes. The lock state may be used when a client device creates a lock on a data object. In some embodiments, a lock owner may be able to upgrade its own locks.

An indication of the new state may be stored by the NFS server 615 in volatile memory 630 in association with an identifier of the data object, such as a file name or other alphanumeric identifier, after the state is updated to reflect the new state. The indication may be, for example, a description of the new state (e.g., state=open), a value, byte or flag corresponding to a particular state field (e.g., open=1), and the like. In some embodiments, the indication may include other variables other than the state, such as an identifier of the client device or user that issued the request to perform the operation, and/or an identifier of the client device or user that is the subject of the request. For example, the indication may include both "read delegation=1" and "client_id=client_ip_address", wherein the client_id represents the IP address of the client device to which "read" access should be granted for the data object.

In some embodiments, the indication of the new state may reflect multiple concurrent states of the data object. For example, the indication of the new state may reflect "read" delegation of multiple client devices, e.g., "read delegation=6" or "read delegation=0110". The indication of the new state may additionally or alternatively reflect another state, such as "open=1"). In some embodiments, the indication of the new state may reflect only a single instance of a particular state of a data object. For example, the indication of the new state may reflect "write" delegation of only one client device, because the write delegation may conflict with any file access by any other client device.

The NFS server 615 may then retrieve the indication of the new state from the volatile memory 630. In some embodiments, however, the NFS server 615 need not retrieve the indication of the new state from the volatile memory 630. The NFS server 615 may write metadata representing the new state at a location in non-volatile storage 635. As used herein, "metadata" may refer to any data that provides information about other data that is typically stored in conjunction with the data for which it is providing information. Thus, the metadata may be written to the non-volatile storage 635 in association with a same or different identifier of the data object (e.g., a same or different file name).

The indication of the new state as stored in volatile memory 630 may be the same as or different than the metadata representing the new state as stored in the non-volatile storage 635. In some embodiments, the indication of the new state as stored in volatile memory 630 may be smaller than the metadata representing the new state as stored in the non-volatile storage 635, due to the smaller storage space available in the volatile memory 630. As one example, the indication of the new state and/or the metadata may be stored as a token (e.g., a byte value). The most significant bit of the token may specify the token type and consequently identify an abstraction and an associated metadata table. The token may also specify a particular operation that was performed (e.g., a particular state as described above).

The metadata may be mapped to a specific location in the non-volatile storage 635. In some embodiments, non-volatile storage 635 may include a series of persistent tables maintained in a single sparse file to store the metadata. As one specific example, five persistent tables may be maintained that directly map the metadata to a specific location in the non-volatile storage 635. In some embodiments, the storage location of the metadata may be computed, algebraically, from the metadata itself. The following Table 1 provides an example of the type of tables that may be included in the sparse file.

TABLE 1

Types of Tables in Sparse File Storing State Metadata

| | |
|---|---|
| client-tab | records the clientid4 values |
| open-tab | records the stateid4 values for open files |
| lock-tab | records the stateid4 values for file locks |
| deleg-tab | records the stateid4 values for delegations |
| locks-tab | records the file lock data (offsets & lengths) |

The structure of the "client-tab" table, "open-tab" table, "lock-tab" table, and "deleg-tab" table lend themselves to the direct mapping approach described above. In some embodiments, the NFS server 615 may record a server boot verifier and a search key in each metadata. The search key may be a small, scalar value that, when multiplied by the fixed size of the record for each type of table, results in a fixed offset of the record.

The organization of the "locks-tab" table may be more complex because it may not have a fixed size. Any given "stateid4" value for file locks (represented persistently by an entry in the "locks-tab" table) may represent a potentially unlimited number of actual locks. Therefore, the "stateid4" value for file locks may not be used as an index into the "locks-tab" table. For example, a client may send two lock requests for a single file: LOCK file1, offset1, size1, and LOCK file1, offset 2, size 2. The result of such an operation may be a single lock "stateid4" value (and a single entry in the "lock-tab" table) that represents two different lucks.

The one-to-many relationship between "stateid4" values for file locks and the locks they represent may require a more complex metadata organization for the "locks-tab" table than may be needed for the other tables. Nevertheless, the direct mapping approach described above may be applicable because each individual lock may be of fixed size. The on-disk representation of the "locks-tab" table may begin with an allocation bit map. Each bit in the map may represent the availability of the corresponding lock slot in the "lock-tab" table, as well as the location of the corresponding lock slot in the "locks-tab" table. When a new lock is allocated, a new bit may be allocated in the "locks-tab" table bit map to hold the lock data.

Each operation on a data object may be applied to the various tables that it affects via synchronous writes to the non-volatile storage 635. For example, a simple lock request may apply one lock: LOCK (off, len)→LSID(N)+ LOCK_DESCRIPTION(Z). In order to execute this lock request and record it in the non-volatile storage 635, the NFS server 615 may allocate a new "stateid4" value for the file lock, allocate a new lock slot from the bit map, apply the file lock in the volatile memory 630, and commit the modifications to the non-volatile storage 635. Thus, at least three different locations in non-volatile storage 635 may need to be modified: an entry in the "lock-tab" table to record the new lock "stateid4" value, an entry in the "locks-tab" table to record the actual lock offset and length, and an entry in the "table-tab" table bit map to reflect the allocation.

When a failure occurs at the NFS server 615 (e.g., a server crash), the NFS server 615 may reestablish the states that existed prior to the failure (e.g., client states, open states, lock states, etc.). In embodiments in which the client device also stores the state information, the NFS server 615 may work with the client device to reestablish the states. The states may be reestablished by retrieving the metadata representing the new state from the location in the non-volatile storage 635. For example, the NFS server 615 may read the metadata from the non-volatile storage 635 and rebuild the state in the volatile memory 630. The NFS server 615 may then resume service automatically in accordance with the new state.

In some embodiments, all of the state changes may be applied independently. The NFS server 615 may employ a vnode ("VOP") interface to permit scattered writes (that may be applied in a single transaction to the intent log). One exemplary VOP interface function that may permit scattered writes is "VOP SCATTER WRITE(vp, scatter-list, FDATA-SYNC)". Each I/O vector in the scatter list may represent an I/O request into a different place in the data object. In this example, iov[0]={offset of(key (LSID)), lsid-buf, sizeof (lsid-buf)}; iov[1]={offset of(bm-entry(L1)), bm-buf, 1}; and iov[2]={offset of(key(L1)), lock-desc-buf, sizeof(lock-desc-buf)}.

Figure 7:
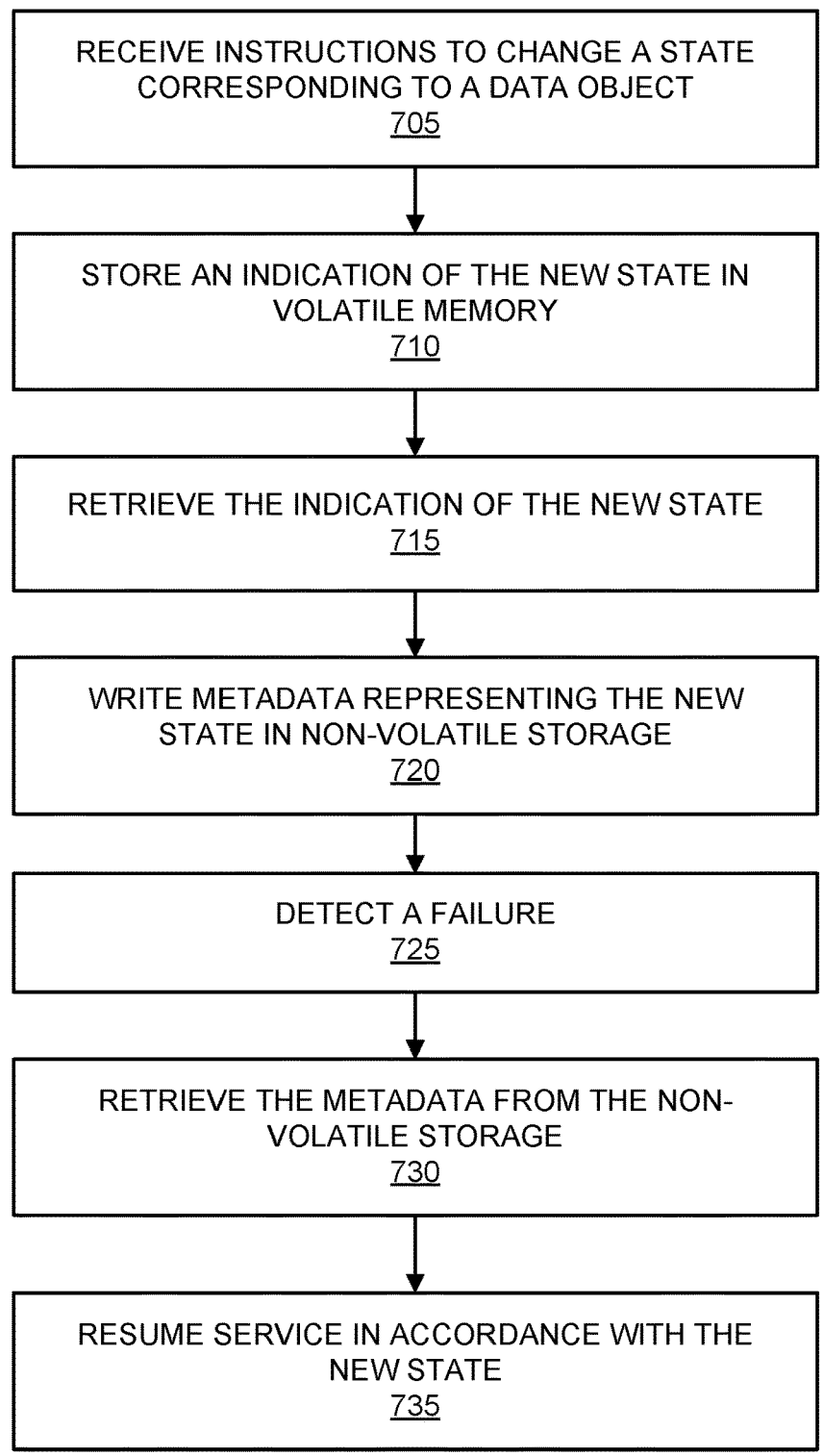
FIG. 7 is a flowchart illustrating a method for continuously available NFS state data, in accordance with some embodiments.

FIG. 7 is a flowchart illustrating a method for continuously available NFS state data, in accordance with some embodiments. At step 705, instructions are received by an NFS server to change a state corresponding to a data object accessible by the NFS server from a current state to a new state. The instructions may be responsive to a request issued by a client device to access or perform operations on the data object accessible by the NFS server. The request and instructions may be encapsulated into a standardized message format defined by the NFS protocol. Once the request to access or perform operations is received by the NFS from the client device, the NFS server may check the permissions stored in the metadata of the data object to determine whether the client device has permission to access the data object or perform the operations. If the client device has the proper permission, the NFS server may allow the client device to access the data object and/or perform the operations.

This access or performance of operations may result in instructions being generated to change the state of the data object from a current state to a new state. In some embodiments, the state of the data object may be replaced. For example, if the data object was closed, but was just opened, the "open" state may be changed from "open=0" to "open=1". In some embodiments, the state of the data object is replaced only upon expiration of the current state. For example, the current state may indicate that a certain IP address associated with a client device has a "delegate_write" state, but that current state may expire when a new IP address associated with a new client device is assigned the "delegate_write" state for that data object. In some embodiments in which multiple instances of a state may be used, the state of the data object may be updated. For example, if one client device had a data object opened, but now four client devices have the data object opened, the "open" state may be updated from "open=1" to "open=4".

In some embodiments, a maximum number of client devices may be indicated for a particular state. For example, a maximum of four client devices (e.g., userid1, userid2, userid3, userid4) may be allocated "delegate_read" access for a given data object at any one time. Such constraints may be made, for example, to ensure adequate performance of the NFS server and its resources. In this example, if a fifth client device is allocated "delegate_read" access, one of the previous client devices may be removed from that state. For example, userid1 may be removed as the client device having the longest access. In another example, userid3 may be removed as having the lowest priority in a hierarchy of the client devices.

In some embodiments, a maximum number of states may be indicated for a particular data object. For example, a particular data object may have a maximum number of two states that can be associated with it. In this example, the data object may have a first state indicating "open=1" and a second state indicating "delegate_read=1". If a third state change for "delegate_write=1" for a particular IP address is specified, one of the previous states may be removed from its association with the data object. For example, "delegate_read" may be set to 0.

In some embodiments, there may be a hierarchy of states applied to determine whether to allow a particular state change and how the new state will affect the current state. For example, a first client device may be associated with a "delegate_read=1" state for the data object. A second client device may be associated with a "delegate_write=1" state for the data object. A third client device may change the state for the data object to "lock=1". The state "lock=1" may reset "delegate_read=0" and "delegate_write=0", such that no client devices may read from or write to the data object.

At step 710, the NFS server stores an indication of the new state in volatile memory. As discussed herein with respect to FIG. 6, the indication of the new state may be stored in any suitable format. The indication of the new state may be stored in volatile memory in accordance with NFS protocol.

At step 715, in some embodiments, the NFS server retrieves the indication of the new state from the volatile memory. In some embodiments, this step is not necessary, and the process may proceed to step 720. The indication may be stored in the volatile memory in association with an identifier of the data object. The identifier of the data object may be, for example, a file name or a location of the file in non-volatile memory.

At step 720, the NFS server writes metadata representing the new state at a location in non-volatile storage. The metadata may be written in association with a same or different identifier of the data object. For example, the indication may be stored in the volatile memory in associated with a location of the file in non-volatile memory, whereas the metadata may be written in association with the file name associated with the data object at the location in the non-volatile memory. The metadata may be written to the non-volatile storage in a same or different format than the indication of the new state that was written to volatile memory. As one example, the metadata may include a token. In an additional or alternative example, the metadata may be written to a table and/or a sparse file. In some embodiments, the metadata may be written synchronously to the non-volatile storage. As used herein, the term "synchronous" means that writing of the metadata must be finished before successive write operations or other processing involving the data object may proceed.

The metadata may be written to non-volatile storage upon occurrence of one or a variety of conditions. For example, the metadata may be written to the non-volatile storage immediately after the indication of the new state is stored in volatile memory. In another example, the metadata may be written to the non-volatile storage concurrently or simultaneously with the indication of the new state being stored in volatile memory, as triggered by the instructions to change the state corresponding to the data object. In another example, the metadata may be written to the non-volatile storage periodically at particular time intervals (e.g., every second, every 10 seconds, every 1 minute, etc.). In another example, the metadata may be written to the non-volatile storage immediately only for certain states based on importance of particular states, while the remainder are written periodically. In other words, the timing of the metadata being written may be state-specific. In still another example, the metadata may be written to the non-volatile storage immediately for state changes reflecting operations performed by certain client devices, while the remainder are written periodically. In other words, the timing of the metadata being written may be client-specific.

At step 725, the NFS server detects a failure involving the NFS server. The failure may be, for example, a loss of power. The loss of power may be expected or unexpected. The loss of power may involve at least the volatile memory in which the indication of the new state is stored. The loss of power may be detected by, for example, accessing volatile memory to determine whether state information is available. For example, if no state information is available for any data objects in the volatile memory, it may be likely that a power failure occurred. In some embodiments, the indication of the new state is erased from the volatile memory upon the failure involving the NFS server. This erasure may be caused by the inability of volatile memory to store data persistently and without power. In another example, state information may be available in the volatile memory that specifically indicates that a power failure occurred in the NFS server. For example, upon turning on after a power failure, a "server_restart" state may be set to 1.

At step 730, the NFS server retrieves the metadata representing the new state from the location in the non-volatile storage. In some embodiments, after retrieving the metadata representing the new state from the location in the non-volatile storage, the NFS server repopulates at least some of the volatile memory to include the indication of the new state in association with the identifier of the data object. For example, the NFS server may convert the metadata back into a form storable and usable by the volatile memory (i.e., into the indication of the new state used previously), which may be different than the form of the metadata. The indication of the new state may be stored back in the volatile memory in association with the identifier of the data object, which may be the same or different identifier used in the non-volatile storage. In some embodiments, all metadata representing new states may be retrieved from non-volatile storage and implemented.

At step 735, the NFS server resumes service in accordance with the new state. For example, the new state may indicate that "write_delegation=1" and "client_id=client_ip_address", wherein the client_id represents the IP address of the client device to which "write" access should be granted for the data object. The NFS server may resume service according to this state, such that subsequent write requests to the data object by the IP address of the client device associated with client_ip_address are allowed.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method comprising:
receiving, by a network file system (NFS) server, a command from a client device to change a state corresponding to a first data object accessible by the NFS server from a current state to a new state; storing, by the NFS server, an indication of the new state in a volatile memory, the indication being stored in association with a first identifier of the first data object;

generating and storing, by the NFS server, metadata representing the new state at a location in a non-volatile storage separate from the volatile memory, wherein the metadata is stored in association with a second identifier of the first data object, wherein storing the indication of the new state in the volatile memory and storing the metadata representing the new state at the location in the non-volatile storage are performed before any further processing involving the first data object is permitted by the NFS server;

detecting, by the NFS server, a failure involving the NFS server, wherein the indication of the new state is erased from the volatile memory upon the failure involving the NFS server;

retrieving, by the NFS server, the metadata representing the new state from the location in the non-volatile storage; and resuming service, by the NFS server, in accordance with the new state.

2. The method of claim 1, further comprising, after retrieving the metadata representing the new state from the location in the non-volatile storage:

repopulating at least some of the volatile memory to include the indication of the new state in association with the identifier of the first data object.

3. The method of claim 1, wherein the new state includes at least one of an open state, a lock state, a client state, or a delegate state.

4. The method of claim 1, wherein the metadata representing the new state retrieved from the non-volatile storage is included in a plurality of metadata representing a plurality of states of a plurality of data objects stored in the non-volatile storage, wherein the plurality of metadata is retrieved from the non-volatile storage, and wherein resuming service in accordance with the new state includes resuming service in accordance with the plurality of states.

5. The method of claim 1, wherein detecting the failure involving the NFS server includes determining that the indication of the new state is erased from the volatile memory.

6. The method of claim 1, further comprising, determining a timing of the storing of the metadata representing the new state, wherein said determining is based on the client device from which the command was received.

7. The method of claim 1, wherein the indication of the new state stored in the volatile memory is smaller than the metadata representing the new state stored in the non-volatile storage.

8. The method of claim 7, further comprising, after retrieving the metadata representing the new state from the location in the non-volatile storage, converting the metadata into a form storable and usable by the volatile memory.

9. A device Comprising:
one or more processors; and
a non-transitory computer-readable medium containing instructions that, when executed by the one or more processors, cause the one or more processors to perform operations including:

receiving a command from a client device to change a state corresponding to a first data object accessible by a network file system (NFS) server from a current state to a new state;

storing an indication of the new state in a volatile memory, the indication being stored in association with a first identifier of the first data object;

generating and storing metadata representing the new state at a location in a non-volatile storage separate from the volatile memory, wherein the metadata is stored in association with a second identifier of the first data object, wherein storing the indication of the new state in the volatile memory and storing the metadata representing the new state at the location in the non-volatile storage are performed before any further processing involving the first data object is permitted by the NFS server;

detecting a failure involving the NFS server, wherein the indication of the new state is erased from the volatile memory upon the failure involving the NFS server;

retrieving the metadata representing the new state from the location in the non-volatile storage; and resuming service in accordance with the new state.

10. The device of claim 9, wherein the operations further include, after retrieving the metadata representing the new state from the location in the non-volatile storage:

repopulating at least some of the volatile memory to include the indication of the new state in association with the identifier of the first object.

11. The device of claim 9, wherein the new state includes at least one of an open state, a lock state, a client state, or a delegate state.

12. The device of claim 9, wherein the metadata representing the new state retrieved from the non-volatile storage is included in a plurality of metadata representing a plurality of states of a plurality of data objects stored in the non-volatile storage, wherein the plurality of metadata is retrieved from the non-volatile storage, and wherein resuming service in accordance with the new state includes resuming service in accordance with the plurality of states.

13. The device of claim 9, wherein detecting the failure involving the NFS server includes determining that the indication of the new state is erased from the volatile memory.

14. The device of claim 9, wherein the operations further include, determining a timing of the storing of the metadata representing the new state, wherein said determining is based on the client device from which the command was received.

15. The device of claim 9, wherein the indication of the new state stored in the volatile memory is smaller than the metadata representing the new state stored in the non-volatile storage.

16. The device of claim 15, wherein the operations further include, after retrieving the metadata representing the new state from the location in the non-volatile storage, converting the metadata into a form storable and usable by the volatile memory.

17. A non-transitory computer machine-readable storage medium comprising computer-executable instructions, that, when executed by one or more processors, cause the one or more processors to:

receive a command from a client device to change a state corresponding to a first data object accessible by a network file system (NFS) server from a current state to a new state; store an indication of the new state in a volatile memory, the indication being stored in association with a first identifier of the data object;

generate and store metadata representing the new state at a location in a non-volatile storage separate from the volatile memory, wherein the metadata is stored in association with a second identifier of the first data object, wherein storing the indication of the new state in the volatile memory and storing the metadata representing the new state at the location in the non-volatile storage are performed before any further processing involving the first data object is permitted by the NFS server;

detect a failure involving the NFS server, wherein the indication of the new state is erased from the volatile memory upon the failure involving the NFS server;

retrieve the metadata representing the new state from the location in the non-volatile storage; and resume service in accordance with the new state.

18. The non-transitory computer machine-readable storage medium of claim 17, wherein the instructions further cause the one or more processors to, after retrieving the metadata representing the new state from the location in the non-volatile storage:

repopulate at least some of the volatile memory to include the indication of the new state in association with the identifier of the first data object.

19. The non-transitory computer machine-readable storage medium of claim 17, wherein the metadata representing the new state retrieved from the non-volatile storage is included in a plurality of metadata representing a plurality of states of a plurality of data objects stored in the non-volatile storage, wherein the plurality of metadata is retrieved from the non-volatile storage, and wherein resuming service in accordance with the new state includes resuming service in accordance with the plurality of states.

20. The non-transitory computer machine-readable storage medium of claim 17, wherein detecting the failure involving the NFS server includes determining that the indication of the new state is erased from the volatile memory.

* * * * *

UNITED STATES PATENT AND TRADEMARK OFFICE
CERTIFICATE OF CORRECTION

PATENT NO. : 10,452,482 B2
APPLICATION NO. : 15/378721
DATED : October 22, 2019
INVENTOR(S) : Baker et al.

It is certified that error appears in the above-identified patent and that said Letters Patent is hereby corrected as shown below:

In the Claims

In Column 17, Line 62, in Claim 9, delete "Comprising:" and insert -- comprising: --, therefor.

In Column 18, Line 30, in Claim 10, after "first" insert -- data --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*